United States Patent [19]

Friederich et al.

[11] 4,289,672

[45] Sep. 15, 1981

[54] SIZING GLASS FIBERS FOR THERMOPLASTIC RESIN REINFORCEMENT

[75] Inventors: Klaus Friederich, Leverkusen, Fed. Rep. of Germany; Gerhard Heinze, Shildgen, Fed. Rep. of Germany; Helmut Reiff, New Martinsville, W. Va.; Dietrich Michael, Krefeld, Fed. Rep. of Germany; Manfred Schön; Peter Markusch, both of Cologne, Fed. Rep. of Germany; Ulrich Haberland, Krofald, Fed. Rep. of Germany; Dieter Dieterich, Leverkusen, Fed. Rep. of Germany; Josef Merten, Korchenbroich, Fed. Rep. of Germany

[73] Assignee: Bayer Aktiengesellschaft, Leverkusen, Fed. Rep. of Germany

[21] Appl. No.: 13,648

[22] Filed: Feb. 21, 1979

Related U.S. Application Data

[60] Division of Ser. No. 882,486, Mar. 1, 1978, abandoned, which is a continuation of Ser. No. 797,156, May 16, 1977, abandoned, which is a continuation of Ser. No. 581,324, May 27, 1975, abandoned.

[30] Foreign Application Priority Data

Jun. 1, 1974 [DE] Fed. Rep. of Germany ....... 2426657

[51] Int. Cl.$^3$ ............................................. C08L 75/06
[52] U.S. Cl. ........................ 260/29.2 TN; 260/37 N; 260/29.2 M; 260/37 PC; 260/40 R; 428/378
[58] Field of Search ................. 260/29.2 TN, 29.2 M, 260/37 N, 37 PC, 40 R; 428/378

[56] References Cited

U.S. PATENT DOCUMENTS

| | | | |
|---|---|---|---|
| 2,946,701 | 7/1960 | Plueddeman | 260/29.2 |
| 3,169,884 | 2/1965 | Marzocchi et al. | 260/29.2 |
| 3,336,253 | 8/1967 | Wong et al. | 260/29.2 |
| 3,437,517 | 4/1969 | Eilerman et al. | 117/126 |
| 3,686,108 | 8/1972 | Reiff et al. | 260/29.2 |

*Primary Examiner*—Theodore E. Pertilla
*Attorney, Agent, or Firm*—Sprung, Felfe, Horn, Lynch & Kramer

[57] ABSTRACT

Glass fibers for reinforcing thermoplastic resins are sized with an aqueous dispersion comprising a polyurethane-ionomer as a film-forming agent and a bonding agent comprising an epoxy-containing alkoxysilane. Advantageously the polyurethane is a very small particle ionomer and the bonding agent is selected from the group consisting of (a) an epoxyalkyl alkoxysilane + an aminoalkyl alkoxysilane,
(b) an epoxyalkyl alkoxysilane + a low-molecular weight aliphatic primary or secondary mono-amine,
(c) an aminoalkyl alkoxysilane + a low-molecular weight monoepoxide, and
(d) an epoxyalkyl alkoxysilane.

16 Claims, No Drawings

SIZING GLASS FIBERS FOR THERMOPLASTIC RESIN REINFORCEMENT

This is a division, of application Ser. No. 882,486, now abandoned filed Mar. 1, 1978 which is a continuation of Ser. No. 797,156, May 16, 1977, which is a continuation of Ser. No. 581,324, May 27, 1975, now abandoned.

This invention relates to a process for producing glass fibers for the reinforcement of thermoplastic resins such as polyamides, polycarbonates or polyesters.

It is known that glass fibers, preferably in the form of cut strands composed of bundles of endless fibers joined together, can be used for reinforcing thermoplastic resins. In order to obtain effective reinforcement in the polymer matrix, it is necessary to ensure that the glass fiber strands do not lose their coherence before they are incorporated in the polymer and that the coating composition which bonds the glass threads together establishes a firm bond between the polymer matrix and the glass fibers without any deleterious chemical reactions occurring between the polymer matrix and the coating composition which could lead to undesirable discoloration and partial degradation of the polymer.

The coating composition is normally produced on the glass fibers as follows. As soon as the glass fibers, which are extruded from the bushing at high velocity, have solidified, that is to say even before they are spooled, they are sized by means of a suitable apparatus (rollers or spray device), i.e. they are impregnated with an aqueous mixture which normally consists of at least one film-forming agent and a bonding agent, in addition to other additives, and which is known as "size", and they are then dried at temperatures above 100° C. The process of drying includes not only the removal of water or other volatile constituents (solvents) but also the hardening of the size components, in particular of the film-forming agent. It is only when drying has been completed that the size has become a solid coating compound. This coating compound serves to ensure problem-free processing of the glass fiber strands during rewinding and/or cutting. If the glass fiber strands are made up into chopped strands in a conventional manner, it is most important that this chopped product should have a high bulk density in order to minimize the volume of space required for collection and shipment, in the interest of economy. It is equally important to be able to empty the chopped strands rapidly and without obstruction from their containers, which are sometimes very large, and convey them through suitable dosing devices (vibrating chutes or the like) to an extruder where they are mixed with the polymers which are to be reinforced. In order to impart to the continuous or chopped glass fiber strands the necessary properties to ensure this, such as coherence of the individual strands, freedom from lumps and pourability, it is essential to dress the strands with a coating compound, i.e. to size them. Apart from the functions already mentioned, it is an important function of the size or of the coating compound produced from it to ensure that the mechanical properties imparted to the glass fiber-reinforced polymers by the reinforcement with sized glass fibers is substantially maintained even under the action of water in the form of atmospheric moisture or after storage in cold, hot or even boiling water.

The numerous requirements which must be met by glass fibers, particularly if they are to be used as chopped strands for the reinforcement of polymers, have not to this day been able to be fulfilled satisfactorily.

In German Offenlegungsschriften No. 1,922,441 and No. 2,300,368, it is recommended to use nonionic, hardenable partially or completely blocked polyurethanes as film-forming agents in sizes for glass fibers which are used for reinforcing polyamides. In the processes described in these Offenlegungsschriften, commercial silane bonding agents such as γ-aminopropyl triethoxysilane, γ-glycidoxypropyltrimethoxy silane, β-(3,4-epoxycyclohexyl)-ethyl trimethoxysilane or N-(β-aminoethyl)-γ-aminopropyl-trimethoxysilane are used in addition as bonding agents. The reinforcing effects which can be achieved with such sizes are not satisfactory, in particular with regard to the important mechanical properties of glass fiber-reinforced polyamides, such as their flexural strength, impact strength and notched impact strength.

It is also known that unsized (so-called water-sized) glass fibers only insufficiently improve the mechanical properties of thermoplastic resins, e.g. their impact strength. For this reason, and also to ensure satisfactory handling and processing, e.g. rewinding or cutting by conventional methods, it is customary to treat glass fibers which are intended for reinforcing thermoplastic and hardenable polymers, including also thermoplastic polyesters, with a size, thereby producing a solid coating on the glass fibers. This coating is intended to protect the glass fibers against mechanical damage, to ensure that the numerous individual threads of which the glass fibers strands are composed will hold together during the operations carried out on the strands between their manufacture by a conventional mechanical drawing process and their incorporation in the polymers which they are intended to reinforce, and above all to establish between the glass-fibers and the polymer a true bond which will substantially withstand the action of water. By a true bond is meant a firm adherence between the two components of the glass fiber/polymer compound material, which is the necessary precondition for an optimum reinforcing effect of the glass fibers.

It is therefore of major technical importance to develop suitable sizes for glass fibers, in particular for the known A-, C- and E-glass fibers, so that these fibers will come as close as possible to producing the maximum reinforcing effect theoretically obtainable in polymers.

By sizes for glass fibers are meant aqueous mixtures which contain as their major comstituents a film-forming agent and a bonding agent.

The film-forming agent used is generally an emulsifiable or dispersible organic polymer. The bonding agent is normally a silane bonding agent or a chromium complex compound, e.g. the product "Volan A" (Manufacturers: Du Pont, U.S.A.). In addition, the sizes frequently contain lubricants, antistatic agents, emulsifiers and other additives.

The sized glass-fibers which have been developed to a high degree of perfection for reinforcing unsaturated polyester resins, so-called UP-resins, are less suitable for thermoplastic polyesters. The additives (epoxysilanes) specifically recommended for improving the mechanical properties of glass fiber-reinforced thermoplastic polyesters (see German OS No. 2,206,804) are also only partially satisfactory since it is not possible to achieve with the aid of these additives the optimum values of important mechanical properties such as the notched strength and the flexural strength.

It is therefore an object of this invention to develop glass fibers having surface finishes which are particularly suitable, for reinforcing thermoplastic resins. In particular, it is intended to improve the flexural strength and notched impact strength of composite materials of glass fibers and thermoplastic polymers.

This invention therefore relates to the application of an aqueous size to glass fibers, which size contains an aqueous polyurethane-ionomer dispersion as a film-forming agent and, as a bonding agent, an epoxyalkyl alkoxysilane or one of the following combinations (a), (b) or (c):

(a) epoxyalkyl alkoxysilane and aminoalkyl alkoxysilane;
(b) epoxyalkyl alkoxysilane and low-molecular weight, aliphatic, primary or secondary monoamine;
(c) aminoalkyl alkoxysilane and low-molecular weight monoepoxide and optionally other additives, e.g. lubricants, wetting agents and antistatic agents.

The polyurethanes which may be used according to the invention are anionic or cationic in structure. It is preferred to use such polyurethane ionomers because these substances disperse spontaneously in water so that the use of emulsifiers can be dispensed with. This constitutes an advantage because of the saving in costs and/or because it avoids undesirable side effects which are due to the property of emulsifiers of rendering substances hydrophilic, which is liable to manifest itself in glass fiber-reinforced thermoplastic polyesters as a certain sensitivity to the action of water. As a consequence of the absence of emulsifiers the film-forming properties are better and the bonding to the substrate is improved.

Ionic polyurethanes are generally referred to as polyurethane ionomers (see D. Dieterich et al in "Angewandte Chemie" 82, (1970), pages 53 to 63). The polyurethane ionomers which may be used according to the invention are thus polyurethanes which contain ionic sites at comparatively large intervals, i.e. they are heteropolymers with a marked segmental structure. The polyurethane ionomers are high-molecular segment polymers which associate in water to form macromolecular structures thus giving rise to particle weights of over 500,000. Due to interchenary interactions (Coulomb forces and hydrogen bridges) they have properties similar to those of crosslinked elastomers. Polyurethane ionomers in polar organic solvents spontaneously give rise to stable aqueous dispersions on the addition of water, the ionomers forming the disperse phase, so that emulsifiers normally used can be dispensed with. After removal of the organic solvent the polyurethane ionomers are then available as dispersions free of emulsifiers and solvents. It is an important advantage of the size useable in accordance with the invention that for this reason they contain neither emulsifiers nor organic solvents which may be harmful to the desired action of the size or the coating compositions produced from the sizes on the glass fibers in the polymer matrix.

The insolubility in water of coatings precipitated from aqueous dispersions of polyurethane ionomers and the formation of these coatings themselves can be explained by the formation of hydrophobic linkages. This likewise explains the excellent fastness to aging of the aqueous polyurethane ionomer dispersions which is technically an important consideration.

One of the most striking properties of the polyurethane ionomers is their excellent film-forming capacity, even at low temperatures, which is practically equivalent to that of solvent systems. Films from these polymers have high elasticity, tensile strength and abrasion-resistance, that is they meet the most important requirements made of film-forming agents for use in sizes for glass-fibers. A further advantage of specifically anionic polyurethane ionomers is their resistance to electrolysis and their excellent compatibility with other polymer dispersions and auxiliaries. This is of very great importance in the production, handling and processing of sizes for glass fibers, since the majority of such sizes contain two to three and often considerably more components; thus good compatibility of the individual components, in particular of the film-forming agent which is present in the largest amount, is absolutely essential from a technological and economical viewpoint. This also explains why special additives are claimed in German OS No. 1 922 441. Their use is intended to prevent non-ionic polyurethanes from precipitating from their dispersions and settling on the size coating device; as a result of this happening the glass fibers issuing from the spinning nozzles break and production is interrupted.

Polyurethane ionomer dispersions can be prepared according to different processes known in the art, e.g. the acetone process or the melt dispersion process (cf. D. Dieterich and H. Reiff, Angew, makromol. Chemie 26, 85, 101 (1972)).

Dispersions of polyurethane ionomers of the kind described for example in "Angewandte Chemie" 82, 53 (1970) are preferred. The ionomer dispersions obtained by the melt dispersion process (for example according to German OS No. 1 770 068 and German OS No. 1 913 271) are also particularly suitable.

The best properties are obtained with those dispersions in which the dispersed particles have an average diameter of less than 1 micron and in particular from 0.05 to 0.5 micron. Dispersions of those polyurethane ionomers which have an ionic group content of about 5 to 30 milliequivalents per 100 g of dry material are also preferred.

Cationic or anionic polyurethane dispersions in which the disperse phase is at least partly microgel in character are particularly preferred. On the other hand, the microgel character should not be too pronounced since the film-forming capacity may be otherwise impaired. Particularly suitable dispersions are characterized in that they yield a slightly opalescent solution when diluted with about 4 to 10 times their amount by weight of tetrahydrofuran. This slight and completely uniform turbidity is easily visible in a layer 2 cm deep, particularly when seen by reflected light. The turbidity may be more pronounced, but under no circumstances should the dispersion be allowed to retain a milky-turbid character when diluted with tetrahydrofuran. On the other hand, a completely clear solution should likewise not be produced. Dispersions which meet the above criterium undergo pronounced swelling when diluted with tetrahydrofuran with the result that when flowing the surface of the slightly turbid solutions is not smooth, but optionally rough.

The criterium regarding the microgel character is applicable to those dispersions which have finished reacting and contain no more reactive groups.

Dispersions which contain reactive groups or reactive crosslinking agents, for example those described in German OS No. 1 770 069 and German OS No. 1 913 271, are preferably also partly microgel in character when they are used as sizes for glass fibers; however, they do not have to be crosslinked at all at the time of application. This is evident from the formation of a clear solution on dilution with tetrahydrofuran. When employing these dispersions which are not crosslinked, however, it must be ensured that a crosslinked coating forms through further reaction on the glass fiber. This means that a sample of the size employed must form a film after drying and condensing at 140° C. which is insoluble in 80% aqueous tetrahydrofuran. Polyurethane dispersions which fulfil the above criteria can be prepared from a plurality of monomers monomer components in the greatest variety of weight ratios. The variety of possibilities available for synthetizing polyurethane ionomers are known to those skilled in the art. Hence products suitable in accordance with the invention may contain urethane groups as well as urea, amide, ester, ether, thioether, acetal biuret, ureide, allophanate, and carboimide units. Polyester-polyurethanes, polyester-polyurethane ureas, polyester amide-polyurethanes and polyester amide-polyurethane ureas and polyester urethane biurets are especially preferred.

Preferred synthetizing components for the polyurethane dispersions used in accordance with the invention are:

(1) polyester diols with molecular weights ranging from 500 to 3000, prepared from adipic acid, phthalic acid, isophthalic acid, tetrahydro-phthalic acid, hexahydrophthalic acid and ethylene glycol, butane diol, neopentyl glycol, hexane diol; a particularly good bond with glass is achieved with products which contain phthalic acid;

(2) diisocyanates, in particular aliphatic or cycloaliphatic diisocyanates, e.g. hexamethylene diisocyanate, xylylene, diisocyanate, isophorone diisocyanate, diisocyanato-dicyclo-hexyl-methane;

(3) chain-lengthening agents, such as the usual glycols, diamines, as well as tert.-amino-glycols for cationic and sulphonato-glycols or sulphonato-diamines for anionic dispersions.

Whilst anionic polyurethane dispersions, particularly those with sulphonate groups, are distinguished by their exceptional stability and excellent compatibility with all kinds of additives, cationic dispersions provide a particularly true bond with glass. The adherence of many cationic polyurethane ionomers to glass fibers is so excellent that under favorable conditions the costly silane bonding agents normally employed may be dispensed with. This is particularly true in the case of polyurethane ionomers synthetized on the base of phthalate esters.

In addition, those polyurethane ionomer dispersions are of especial interest which contain at least 0.1% of formaldehyde or an equivalent amount of methylol compounds as these ensure the crosslinked character of the condensed size. Dispersions prepared by the isocyanate polyaddition process contain formaldehyde (optionally bonded) generally in an amount of 0.1–0.8% based on the solids content; dispersions, which were synthetized from the initial oligomer stages by formaldehyde polycondensation, contain a considerably larger amount of (bonded) formaldehyde, preferably 2–10%.

Exceptionally water-resistant polyurethane ionomers are those which have in addition been chemically crosslinked by polyisocyanates or other reactive components such as formaldehyde or its derivatives. Such polyurethane ionomers particularly suitable for the glass fibers according to the invention.

Optimum properties are achieved by virtue of the microgel or gel character of the polyurethane ionomer size. The size can be easily coated to glass fiber substrates and forms an excellent, closely adhering, homogeneous film even at low temperatures. At the same time, the thermoplasticity of the size is advantageously reduced, thereby resulting in good freedom from tackiness of the resultant rovings as well as providing the composite materials of glass-fiber and resin with excellent mechanical properties. This favorable combination of desirable properties in a glass-fiber size has not been hitherto achieved by products known in the art.

To obtain optimum properties it is furthermore necessary that the dispersed polyurethane ionomers themselves should be capable of drying to yield high-molecular resins with good properties. Those polyurethanes are preferred which form a film having the following values when the dispersion is poured on a flat support and allowed to dry:

tensile strength: higher than 50 kp/cm$^2$, preferably higher than 100 kp/cm$^2$
elongation at break: 100–600%
short-A-hardness: 50–90
swelling in water at 20° C. less than 30%

Dispersions of anionic polyurethanes are especially preferred, especially those which contain sulfonate groups or carboxylate groups.

The concentration of the polyurethane dispersion in a size suitable for use according to the invention is about 1 to 15% by weight, based on the polyurethane solid content. Concentrations below about 1% by weight produce only an insufficient protective film on the fibers, whereas concentrations higher than about 15% by weight result in excessively thick layers of coating which weaken the composite material produced with these fibers. Moreover, it is prohibitive for reasons of cost to apply larger quantities of film-forming agents to the fibers. The concentration of the polyurethane dispersion used in the size is preferably between about 3 and 7% by weight. It is found in practice that when such a size is applied to fibers in the spinning process, the dry fibers obtained after evaporation of the water are loaded with about 0.4 to 2.0%, preferably 0.5 to 1.5% by weight of size constituents, the film-forming agent generally predominating in quantity. Size contents in this range are regarded as optimum for reinforcing thermoplastic polyesters, both on technical grounds and out of economic considerations.

Although the molar ratios of the components in a combination bonding agent used according to the invention may range between about 5:1 and 1:5, it is advisable for economical reasons to use the more expensive component more sparingly, that is to say in combination types (a) and (b) generally the silane component and in combination type (c) at present the epoxyalkyl trialkoxysilane, and to increase the proportion of the less expensive component accordingly within the range of molar ratios indicated above.

The concentration of the bonding agent in the size used according to the invention is about 0.05 to 1.5% by weight, preferably about 0.15 to 0.75% by weight. Concentrations above about 1.5% by weight are uneconomical on account of the high cost of the silane while at concentrations below about 0.05% by weight the bonding agent is not sufficiently effective. Concentrations of between about 0.05 and 0.15% by weight are chosen if application of the size to the glass fibers is not carried out during the spinning process, i.e. within fractions of a second, but at some other stage, for example by impregnating the glass fibers in a sizing bath, a method which for practical reasons requires a much longer time, during which much greater utilization of the size is possible than in cases where the size is applied during the spinning process.

Epoxyalkyl alkoxysilanes which may be used according to the invention include epoxyalkyl trialkoxysilanes, epoxyalkyl-alkyldialkoxysilanes and epoxyalkyl-aryl-dialkoxysilanes, preferably where the alkyl moieties contain up to 6 carbon atoms, especially aliphatic moieties of up to 4 carbon atoms or cyclopentyl or cyclohexyl, and the aryl moiety is phenyl. γ-glycidoxypropyl trimethoxysilane and β-(3,4-epoxycyclohexyl)-ethyl trimethoxysilane are preferred.

It is suitable to include a lubricant in a size according to the invention. These lubricants may be chosen from among the following groups of substances: polyalkylene glycols, higher fatty acid amides containing about 12 to 18 carbon atoms, and polyolefin dispersions. Preferred polyalkylene glycols are those wherein the alkylene radicals contain up to about 6, especially up to about 4, carbon atoms, e.g. polyethylene glycol, polypropylene glycol, poly-ethylene-propylene glycol, etc. Preferred polyolefins are homopolymers and copolymers of α-olefins containing up to about 6, especially up to about 4, carbon atoms, e.g. polyethylene, polypropylene, ethylene-propylene copolymer, etc. The lubricant is suitably used in concentrations of about 0.05 to 1% by weight. Concentrations in the upper region of this range would be indicated in particular if the lubricant used is a polyolefin dispersion. Values in the lower region of this concentration range are preferred if the lubricant used is a polyalkylen glycol or a higher fatty acid amide. If a polyolefine dispersion is used, preferably it is anionic or nonionic if the film-forming agent is an anionic polyurethane, and cationic or nonionic if the polyurethane is cationic, in order to prevent mutual coagulation of the dispersions in the size. Apart from this restriction, the choice of a suitable lubricant from the groups of substances mentioned above is not critical. The purpose of the lubricant is to facilitate subsequent processing of the glass fibers but it has no material influence on the bonding action of the sizes according to the invention, that is to say on the action which improves the mechanical properties of the glass fiber/polymer composite material.

Among the group of aminoalkyl alkoxysilanes which may be used according to the invention, it is preferred to use those wherein the alkyl moieties contain up to 6 carbon atoms, especially aliphatic moieties of up to 4 carbon atoms or cyclopentyl or cyclohexyl, e.g. γ-aminopropyl trialkoxysilanes such as γ-aminopropyl triethoxysilane, γ-aminopropyl trimethoxysilane and (β-aminoethyl)-γ-aminopropyl trimethoxysilane.

Low molecular weight, aliphatic monoamines which may be used according to the invention include primary amines containing from 1 to 6 carbon atoms and secondary amines containing from 1 to 5 carbon atoms per organic group, such as diethylamine, dipropylamine, dibutylamine, methyl ethylamine, methyl propylamine, methyl butylamine, ethyl propylamine, ethyl butylamine, methyl amylamine, ethyl amylamine and diamylamine.

Low molecular weight monoepoxides which may be used according to the invention include alkylene oxides such as ethylene, propylene and butylene oxide, epihalogen hydrins such as epichlorohydrin and epibromohydrin, and aromatic mono-epoxides such as styrene oxide.

In reinforcing polycarbonate resin, although glass fibers which have been sized according to the invention with aqueous polyurethane dispersions in combination with an epoxyalkyl trialkoxysilane give rise to excellent properties, it is preferred to use bonding agent combinations in accordance with the above mentioned groups (a), (b), or (c) which have both an epoxy and an amino function.

Particularly advantageous combination bonding agents of type (a) include γ-aminopropyl triethoxysilane and γ-glycidoxypropyl trimethoxysilane or of γ-aminopropyl triethoxysilane and β-(3,4-epoxycyclohexyl)-ethyl trimethoxysilane.

Particularly advantageous combination bonding agents of type (b) include γ-glycidoxypropyl trimethoxysilane or β-(3,4-epoxycyclohexyl)-ethyl trimethoxysilane and n-propylamine.

A particularly advantageous combination bonding agent of type (c) includes γ-aminopropyl triethoxysilane and epichlorohydrin.

Both the known types of E-, A-, C- and S-glass used for the manufacture of endless glass filaments and the known glass staple fiber products are suitable for producing the glass fibers sized according to the invention. So-called high modulus and high strength glasses which have been developed for special purposes may also be used for producing sized glass fibers according to the invention. Among the various types of glass mentioned above for the manufacture of glass filaments (so-called endless filaments), the E-glass fibers are the most important for the reinforcement of synthetic resins because in contrast to A- and C-glass, E-glass is practically free from alkali, a property to which it owes its good electrical insulating properties and high resistance to water and alkalies. In addition, E-glass fibers are superior to A-glass fibers in their tensile strength and modulus of elasticity.

E-, A-, S- and C-glass have the following chemical composition in percentages by weight (data obtained from Wende/Moebes/Marten "Glasfaserverstärkte Plaste", VEB Deutscher Verlag für Grundstoffindustrie Leipzig, 1969, 2nd edition, p. 74):

| Components | E-glass (for the direct spinning process) | A-glass | C-glass | S-glass |
| --- | --- | --- | --- | --- |
| $SiO_2$ | 53.2 | 65.9 | 65.0 | 65 |
| $Al_2O_3$ | 14.8 | 3.8 | 4.0 | 25 |
| $Fe_2O_3$ | — | 0.1 | — | — |
| CaO | 21.1 | 6.9 | 14.0 | — |
| MgO | 0.3 | 4.6 | 3.0 | 10 |
| $B_2O_3$ | 9.0 | 2.3 | 5.0 | — |
| $Na_2O + K_2O$ | 1.3 | 16.4 | 8.0 | — |

The sized glass fibers according to the invention may be used for reinforcing thermoplastic resins which contain polar groups regularly distributed in their chain structure. By "polar groups" are meant groups which under the known conditions employed for incorporating sized glass fibers into thermoplastic resins, are capable of forming such physical and/or chemical bonds with the sized glass fibers according to the invention that the glass fibers can be demonstrated to have a distinct reinforcing effect on the resin. This can be proved e.g. by measurement of the flexural strength, impact strength, notched impact strength etc. on standard test samples. The following are polar groups within this meaning: primary, secondary and tertiary amino groups, amide and imide groups, carbonyl, carboxyl, ester, ether, acetal, oxirane and oxetane groups and nitrile and sulfone groups. Resins which are particularly suitable for reinforcing with the sized glass fibers according to the invention are: polyamides, polycarbonates, thermoplastic polyesters such as polyethylene and polybutylene terephthalates, styrene-acrylonitrile copolymers, acrylonitrile-butadiene-styrene terpolymers and acrylonitrilemethyl methacrylate copolymers.

The process according to the invention will now be explained in more detail with the aid of the following Examples.

EXAMPLE 1

(a) Composition of the size

| | |
|---|---|
| Polyurethane-anionomer dispersion No. 1 (solids content 40%) | 12.5% by weight |
| γ-aminopropyl triethoxysilane | 0.33% by weight |
| epichlorohydrin | 0.17% by weight |
| polyethylene dispersion (solids content 40%) | 1.25% by weight |
| deionized water | 85.75% by weight |

(b) Preparation of polyurethane anionomer dispersion No. 1

209 g (0.125 mole) of a polyadipate of an equimolar hexanediol-neopentyl glycol mixture (average molecular weight 1670) are dehydrated in a water jet pump vacuum at 120° C. for 30 minutes with stirring. The substance is left to cool to 70° C. and 38 g (0.226 mole) of 1,6-diisocyanatohexane are then added. When the exothermic reaction has died down, the reaction mixture is stirred for 2 hours at 120° C. After cooling to 70° C., 700 ml of acetone are added and the bath temperature is adjusted to 60° C. so that the reaction mixture is kept at a temperature of 55° C.

A chain-lengthening solution is prepared from 13.75 g of an aqueous solution of sodium N-2-aminoethyl)-2-aminoethane sulfonate (solids content 43% by weight) (0.0313 mole) 1.90 g (0.0317 mole) of ethylene diamine and 58 g of water and added to the reaction mixture which is kept at 55° C. The mixture is stirred for 5 minutes and 270 ml of distilled water are then added. The acetone is then distilled off in a water jet pump vacuum.

The finely divided anionic polyurethane dispersion obtained in this way has a solids content of 40% by weight and, based on its solid content, it contains 0.96% by weight of $SO_3^\circ$ groups; it has a particle size of 150-200 m$\mu$. The disperse phase shows microgel-character (slightly cloudy solution after dilution with tetrahydrofuran).

(c) Preparation of the size

Approximately half the required quantity of water is introduced into a mixing vessel. The polyurethane dispersion is added with stirring. The polyethylene dispersion, silane and epichlorohydrin are then added one after the other with continued stirring. After the addition of the remaining water, the pH of the size is adjusted to 5.9-6.0 with acetic acid.

(d) Preparation of the composite material of glass fiber and polycarbonate and testing the material for discoloration and mechanical properties E-glass fibers impregnated in a conventional manner with the size used according to the invention are fed in the form of chopped strands 6 mm in length, each composed of 400 individual filaments with a diameter of 12$\mu$, into a double-shaft extruder where they are mixed with molten polycarbonate "Makrolon 3200" (Manufacturers: Bayer AG, Leverkusen) and extruded. The resulting Makrolon granulate which contains 20% by weight of glass fibers is used to produce test samples in a screw extruder. The following mechanical properties are determined on these samples according to the standards mentioned:

| | | |
|---|---|---|
| Flexural strength | DIN 53452 | 1627 kp/cm$^2$ |
| Impact strength | DIN 53453 | 61.8 cm kp/cm$^2$ |
| Notched impact strength | DIN 53453 | 15.0 cm kp/cm$^2$ |

The glass fiber-reinforced polycarbonate is virtually colorless. The superior quality of glass fibers sized according to the invention is clear from the absence of any undesirable discoloration in the reinforced polycarbonate and the hitherto unobtainable level of the mechanical properties indicated above.

EXAMPLE 2

The technical advance of the invention will now be illustrated more clearly with the aid of a comparison with a glass fiber-reinforced polycarbonate ("Makrolon 3200") which has been reinforced in the same way as indicated above with 20% by weight of ordinary commercial E-glass fibers in the form of chopped strands 6 mm in length. These glass fibers were described by the manufacturers as optimum for the reinforcement of polycarbonates. The following mechanical properties were measured on test samples of this material:

| | | |
|---|---|---|
| Flexural strength | DIN 53453 | 1591 kp/cm$^2$ |
| Impact strength | DIN 53453 | 49.7 cm kp/cm$^2$ |
| Notched impact strength | DIN 53453 | 9.8 cm kp/cm$^2$ |

The glass fiber-reinforced polycarbonate has a distinct yellow discoloration. This discoloration proves that the commercial glass fibers are inferior to fibers which have been sized according to the invention since in both cases E-glass was used as the reinforcing material and "Makrolon 3200" as the matrix and the operating conditions and test conditions were completely identical.

Other sizes according to the invention are described in the Examples below. Preparation of these sizes is carried out by the method described in Example 1. Manufacture of the glass fiber-reinforced polycarbonate from "Makrolon 3200" and E-glass fiber strands which have been sized in known manner with the size according to the invention (length of strands 6 mm, 400 individual filaments with a diameter of 12$\mu$) and testing of the samples are also carried out as described in Example 1. The glass content of the reinforced polycarbonates is in each case 20% by weight. The composition of the sizes, the mechanical values found on the test samples and the color of the reinforced polycarbonates are given in the following Examples.

EXAMPLE 3

(a) Composition of size

| | |
|---|---|
| Polyurethane anionomer dispersion No. 2 (solids content 30%) | 16.7% by weight |
| γ-glycidoxypropyl trimethoxysilane | 0.25% by weight |
| Polyethylene dispersion (solids content 40%) | 1.25% by weight |
| Deionized water | 81.8% by weight |

(b) Preparation of polyurethane anionomer dispersion No. 2

Reaction mixture:
(1) 5080 g of hexanediol-neopentyl glycol-polyadipate, average molecular weight 1980
(2) 980 g of an adduct of 1,1,1-trimethylolpropane and tetrahydrophthalic acid anhydride used in a molar ratio of 1:1:2; 80% in methyl isobutyl ketone
(3) 330 g of urea
(4) 200 g of 2-dimethylaminoethanol
(5) 1000 g of 1,6-diisocyanatohexane
(6) 1000 ml of methyl isobutyl ketone (MIBK)
(7) 170 g of a polyether of ethylene oxide and propylene oxide started on glycerol
(8) 7 g of ethoxylated nonyl phenol
(9) 500 g of 30% formaldehyde in water
14500 ml of water Method The chain-lengthening agent (2), urea (3) and MIBK (6) are added to the dehydrated ester (1). The diisocyanate (5) is added at 35° C. and the mixture is stirred for 1½ hours at 60° to 68° C. The mixture is then heated to 135° C. and stirred at this temperature for 1 hour. The polyether (7) and ethoxylated nonylphenol (8) are added to the melt. The mixture is dispersed by stirring at a rate of 100 revs. per min. 2.5 liters of water are added with the amine (4) in 2 minutes, the temperature being thereby lowered from 95° C. to 85° C. The mixture is then stirred first for 1 hour at 80° C. and then for 1 hour while it is cooled with running water. A 32% PU dispersion with pH=7 and FBF$_4$=26" is obtained. The dispersion is diluted to 30%. It is indefinitely stable in storage at room temperature. The dispersion when dried and heated to 140° C. yields a film insoluble in 80% tetrahydrofuran.

(c) Mechanical properties of the test sample

| | | |
|---|---|---|
| Flexural strength | DIN 53452 | 1704 kp/cm$^2$ |
| Impact strength | DIN 53453 | 57.4 cm kp/cm$^2$ |
| Notched impact strength | DIN 53453 | 11.0 cm kp/cm$^2$ |

(d) Color

Virtually unchanged

EXAMPLE 4

(a) Composition of the size

| | |
|---|---|
| Polyurethane dispersion No. 1 (solids content 40%) | 12.5% by weight |
| γ-aminopropyl triethoxysilane | 0.25% by weight |
| γ-glycidoxypropyl trimethoxysilane | 0.25% by weight |
| Polyethylene dispersion (solids content 40%) | 1.25% by weight |
| Deionized water | 85.75% by weight |

(b) Mechanical properties of the test sample

| | | |
|---|---|---|
| Flexural strength | DIN 53452 | 1677 kp/cm$^2$ |
| Impact strength | DIN 53453 | 55.0 cm kp/cm$^2$ |
| Notched impact strength | DIN 53453 | 15.8 cm kp/cm$^2$ |

(c) Color

Virtually unchanged

EXAMPLE 5

(a) Composition of the size

| | |
|---|---|
| Polyurethane dispersion No. 1 (solids content 40%) | 12.5% by weight |
| γ-glycidoxypropyl trimethoxysilane | 0.4% by weight |
| n-propylamine | 0.1% by weight |
| Polyethylene dispersion (solids content 40%) | 1.25% by weight |
| Deionized water | 85.75% by weight |

(b) Mechanical properties of the test sample

| | | |
|---|---|---|
| Flexural strength | DIN 53452 | 1659 kp/cm$^2$ |
| Impact strength | DIN 53453 | 59.4 cm kp/cm$^2$ |
| Notched impact strength | DIN 53453 | 16.1 cm kp/cm$^2$ |

(c) Color

Virtually unchanged

EXAMPLE 6

(a) Composition of the size

| | |
|---|---|
| Polyurethane dispersion No. 1 (solids content 40%) | 12.5% by weight |
| γ-aminopropyl triethoxysilane | 0.25% by weight |
| β-(3,4-epoxycyclohexyl)-ethyl trimethoxysilane | 0.25% by weight |
| Polyethylene dispersion (solids content 40%) | 1.25% by weight |
| Deionized water | 85.75% by weight |

(b) Mechanical properties of the test sample

| | | |
|---|---|---|
| Flexural strength | DIN 53452 | 1739 kp/cm$^2$ |
| Impact strength | DIN 53453 | 57.0 cm kp/cm$^2$ |
| Notched impact strength | DIN 53453 | 16.1 cm kp/cm$^2$ |

(c) Color

Virtually unchanged

Example 7

(a) Composition of the size used according to the invention

Polyurethane anionomer dispersion No. 3

-continued

| solids content 40%) | 12.5% by weight |
|---|---|
| γ-aminopropyl triethoxysilane | 0.5% by weight |
| Polyethylene | 1.25% by weight |
| Deionized water | 85.75% by weight |

(b) Preparation of polyurethane anionomer dispersion No. 3

209 g (0.125 mole) of a hexanediol-neopentyl glycol-polyadipate (average molecular weight 1670) are dehydrated in a water jet pump vacuum at 120° C. with stirring for 30 minutes. The substance is left to cool to 70° C. and 30 g (0.226 mole) of 1,6-diisocyanatohexane are added. When the exothermic reaction has died down, the reaction mixture is stirred for 2 hours at 120° C. After it has cooled to 70° C., 700 ml of acetone are added and the bath temperature is adjusted to 60° C. so that the reaction mixture is kept at a temperature of 55° C.

A chain-lengthening solution is prepared from 13.75 g of an aqueous solution of sodium N-(2-aminoethyl)-2-aminoethane sulfonate (solids content 43% by weight) (0.0313 mole), 1.90 g (0.0317 mole) of ethylene diamine and 58 g of water, and this solution is added to the reaction mixture which is kept at a temperature of 55° C. The mixture is then stirred for 5 minutes and 270 ml of distilled water are added. The acetone is then distilled off in a water jet pump vacuum.

The finely divided, anionic polyurethane dispersion obtained has a solids content of 40% by weight and, based on the solids content, it contains 0.96% by weight of $SO_3^-$ groups; it has a particle size of 150–200 nm.

(c) Preparation of the size

Approximately half the required quantity of water is introduced into a mixing vessel. The polyurethane anionomer dispersion is added with stirring. The polyethylene dispersion and the silane are then added one after the other with continued stirring. After addition of the remaining water, the pH of the size is adjusted to 5.9–6.0 with acetic acid.

(d) Testing of the reinforcing effect of glass fibers produced according to the invention in polyamide E-glass fibers treated according to the invention with the size described above are incorporated in the form of chopped strands 6 mm in length, composed of 400 individual filaments each with a diameter of 12μ, into nylon-6 ("Durethan BK 31 F", Manufacturers: Bayer AG, Leverkusen) in a double-shaft extruder. The glass content of the glass fiber-reinforced polyamide is 35%. Test samples are produced from this glass fiber-reinforced material in an injection moulding machine and used to test the mechanical properties in accordance with the standards mentioned below:

| Flexural strength | DIN 53 452 | 2767 kp/cm² |
|---|---|---|
| Impact strength | DIN 53 453 | 68.7 cm kp/cm² |
| Notched impact strength | DIN 53 453 | 13.4 cm kp/cm² |

EXAMPLE 8

(a) Composition of the size used according to the invention

| Polyurethane anionomer dispersion No. 3 | |
|---|---|
| (solids content 40%) | 12.5% by weight |
| γ-glycidoxypropyl trimethoxysilane | 0.25% by weight |
| Deionized water | 87.25% by weight |

Preparation of the size and testing of the glass fibers according to the invention for their reinforcing effect in polyamide are carried out as described in Example 7. The following mechanical properties are tested:

| Flexural strength | DIN 53 452 | 2748 kp/cm² |
|---|---|---|
| Impact strength | DIN 53 453 | 67.8 cm kp/cm² |
| Notched impact strength | DIN 53 453 | 13.5 cm kp/cm² |

EXAMPLE 9

(a) Composition of the size used according to the invention

| Polyurethane anionomer dispersion No. 3 | |
|---|---|
| (solids content 40%) | 12.5% by weight |
| γ-aminopropyl triethoxysilane | 0.33% by weight |
| Epichlorohydrin | 0.17% by weight |
| Polyethylene dispersion (solids content 40%) | 1.25% by weight |
| Deionozed water | 85.75% by weight |

Preparation of the size and testing of the glass fibers according to the invention for their reinforcing effect in polyamide are carried out as indicated in Example 7. The following mechanical properties are exhibited:

| Flexural strength | DIN 53 452 | 3031 kp/cm² |
|---|---|---|
| Impact strength | DIN 53 453 | 72.1 cm kp/cm² |
| Notched impact strength | DIN 53 453 | 17.8 cm kp/cm² |

EXAMPLE 10

Size not according to the invention but prepared according to German OS No. 2 300 368, Example 4, from the following components:

| Urethane latex (nonionic) X-1033 (solids content 40%) Manufacturers: Wyandotte Chemical Corp., Wyandotte, Mich., USA | 12.5% by weight |
|---|---|
| γ-aminopropyl triethoxysilane | 0.25% by weight |
| Polyolefin emulsion (solids content 40%) | 1.0% by weight |

This size is prepared by the method described in Example 1 of German OS No. 2 300 368 and used for finishing glass fibers by the method described in Example 7. Hereinabove incorporation of the glass fibers into nylon-6 ("Durethane BK 31 F") and testing of the mechanical properties are also carried out in exactly the same way as described in Example 7. The following mechanical properties were measured:

| | | |
|---|---|---|
| Flexural strength | DIN 53 452 | 2697 kp/cm² |
| Impact strength | DIN 53 453 | 66.0 cm kp/cm² |
| Notched impact strength | DIN 53 453 | 12.8 cm kp/cm² |

The results of Example 7 to 10 show clearly the superiority of the sizes according to the invention over a size which contains a nonionic polyurethane instead of one of the polyurethane anionomers used according to the invention.

Other sizes according to the invention are described in Examples 11 to 14 below. Preparation of these sizes is carried out by the method described in Example 7. Manufacture of the glass fiber-reinforced polyamides and testing of the mechanical properties are also carried out as described in Example 7 and therefore only the composition of the size and the mechanical properties will be indicated. The glass content of the glass fiber-reinforced polyamides is in each case 35% by weight.

EXAMPLE 11

(a) Composition of size

| | |
|---|---|
| Polyurethane anionomer dispersion No. 3 | 12.5% by weight |
| γ-aminopropyl triethoxysilane | 0.25% by weight |
| γ-glycidoxypropyl trimethoxysilane | 0.25% by weight |
| Polyethylene dispersion (solids content 40%) | 1.25% by weight |
| Deionized water | 85.75% by weight |

(b) Mechanical properties of the test samples

| | | |
|---|---|---|
| Flexural strength | DIN 53 452 | 2976 kp/cm² |
| Impact strength | DIN 53 453 | 66.3 cm kp/cm² |
| Notched impact strength | DIN 53 453 | 14.6 cm kp/cm² |

EXAMPLE 12

(a) Composition of size

| | |
|---|---|
| Polyurethane anionomer dispersion No. 3 | 12.5% by weight |
| γ-aminopropyl triethoxysilane | 0.25% by weight |
| β-(3,4-epoxycyclohexyl)-ethyl trimethoxysilane | 0.25% by weight |
| Polyethylene dispersion | 1.25% by weight |
| Deionized water | 85.75% by weight |

(b) Mechanical properties of the test sample

| | | |
|---|---|---|
| Flexural strength | DIN 53 452 | 2907 kp/cm² |
| Impact strength | DIN 53 453 | 70.9 cm kp/cm² |
| Notched impact strength | DIN 53 453 | 16.5 cm kp/cm² |

EXAMPLE 13

(a) Composition of size

| | |
|---|---|
| Polyurethane anionomer dispersion No. 3 | 12.5% by weight |
| γ-glycidoxypropyl trimethoxysilane | 0.4% by weight |
| n-propylamine | 0.1% by weight |
| Polyethylene dispersion (solids content 40%) | 1.25% by weight |
| Deionized water | 85.75% by weight |

(b) Mechanical properties of the test samples

| | | |
|---|---|---|
| Flexural strength | DIN 53 452 | 2793 kp/cm² |
| Impact strength | DIN 53 453 | 69.6 cm kp/cm² |
| Notched impact strength | DIN 53 453 | 13.9 cm kp/cm² |

EXAMPLE 14

(a) Composition of size

| | |
|---|---|
| Polyurethane anionomer dispersion No. 4 (solids content 40%) | 12.5% by weight |
| γ-aminopropyl triethoxysilane | 0.25% by weight |
| Epichlorohydrin | 0.25% by weight |
| Stearic acid amide | 0.05% by weight |
| Deionized water | 86.95% by weight |

(b) Preparation of polyurethane anionomer dispersion No. 4

Reaction mixture:
5080 g of hexanediol-neopentyl glycol-polyadipate with an average molecular weight of 1980
980 g of an adduct of 1,1,1-trimethylolpropane and tetrahydrophthalic acid anhydride in a molar ratio of 1:1.2; 80% in methyl isobutyl ketone,
350 g of urea,
200 g of 2-dimethylaminoethanol,
1000 g of 1,6-diisocyanatohexane,
1000 ml of methyl isobutyl ketone (MIBK),
170 g of a polyether of ethylene oxide and propylene oxide started on glycerol,
70 g of ethoxylated nonyl phenol,
500 ml of 30% formaldehyde in water and
14500 ml of water.

Method of preparation: The chain-lengthening agent, urea and MIBK are added to the dehydrated ester. The diisocyanate is added at 35° C. and the mixture is stirred at 60° C. (Triax 68°) for 1½ hours. It is then heated to 135° C. and stirred at this temperature for 1 hour. The polyether and the ethoxylated nonyl phenol are added to the melt which is then dispersed by stirring at a rate of 100 m/min. 2.5 liters of water are added with the amine in 2 minutes 7 liters of water followed by 5 liters of water with formaldehyde are added in 7 minutes, the temperature dropping from 95° C. to 85° C. The mixture is then stirred for 1 hour at 80° C., the temperature being kept down by cooling with running water. A 32% PU dispersion and a pH of 7 and FBV₄=26" is obtained. The dispersion was diluted to 30%. It is indefinitely stable at room temperature.

(c) Mechanical properties of the test samples

| | | |
|---|---|---|
| Flexural strength | DIN 53 452 | 2856 kp/cm² |
| Impact strength | DIN 53 453 | 70.3 cm kp/cm² |
| Notched impact strength | DIN 53 453 | 14.2 cm kp/cm² |

EXAMPLE 15

The following mechanical properties are found on test samples of nylon-6 ("Durethan BK 31 F") which has been reinforced with 35% of commercial E-glass fibers in the form of chopped strands (length 6 mm)

which are described as particularly suitable for the reinforcement of polyamides:

| Flexural strength | DIN 53 452 | 2544 kp/cm$^2$ |
| Impact strength | DIN 53 453 | 61.6 cm kp/cm$^2$ |
| Notched impact strength | DIN 53 453 | 11.0 cm kp/cm$^2$ |

When the mechanical properties obtained in Example 7 to 9 and 11 to 14 for nylon-6 which has been reinforced with glass fibers according to the invention are compared with the mechanical properties obtained in Example 15 for the same nylon-6 which has been reinforced with ordinary commercial E-glass fibers in the same proportion by weight (35% by weight), the superiority of the size according to the invention can be clearly seen.

EXAMPLE 16

(a) Composition of the size used according to the invention

| Polyurethane anionomer dispersion (solids content 40%) | 12.5% by weight |
| (3,4-epoxycyclohexyl)-ethyl trimethoxysilane | 0.25% by weight |
| Polyethylene dispersion (solids content 40%) | 1.25% by weight |
| Deionized water | 86.0% by weight |

(b) Preparation of the polyurethane anionomer dispersion 209 g (0.125 mole) of a hexanediol-neopentylglycol-polyadipate (average molecular weight 1670) are dehydrated in a water jet pump vacuum at 120° C. for 30 minutes with stirring. The substance is left to cool to 70° C. and 38 g (0.226 mole) of 1,6-diisocyanatohexane are then added. When the exothermic reaction has died down, the reaction mixture is stirred for 2 hours at 120° C. When the reaction mixture has cooled to 70° C., 700 ml of acetone are added and the bath temperature is adjusted to 60° C. so that the reaction mixture is kept at a temperature of 55° C.

The chain-lengthening solution is prepared from 13.75 g of an aqueous solution of sodium N-(2-aminoethyl)-2-aminoethane sulfonate (solids content 43% by weight) (0.0313 mole), 1.90 g (0.0317 mole) of ethylene diamine and 58 g of water, and added to the reaction mixture which is kept at 55° C. The mixture is then stirred for 5 minutes and 270 ml of distilled water are added. The acetone is then distilled off in a water jet pump vacuum.

The finely divided, anionic polyurethane dispersion obtained has a solids content of 40% by weight, and, based on the solids content, it contains 0.96% by weight of SO$_3$° groups; it has a particle size of 150 to 200 nm.

(c) Preparation and application of the size

About half the required quantity of water is introduced into a mixing vessel. The polyurethane anionomer dispersion and the polyethylene dispersion are added one after another with stirring. The pH of the mixture is then adjusted to 5.0. A hydrolyzate of (3,4-epoxycyclohexyl)-ethyl trimethoxysilane prepared in accordance with the instructions of the silane manufacturer (Union Carbide Corporation, New York) is then added. After about 15 minutes' stirring, the size is ready for use. It is transferred to a conventional glass fiber sizing apparatus where it is applied in known manner, e.g. by a system of rollers or spray nozzles, to glass fibers drawn from a conventional spinning die, and the glass fibers produced according to the invention are combined to form one or more strands and wound on a rotating drum and then dried at temperatures between 100° and 150° C.

(d) Processing of the glass fiber strands, their incorporating into polybutylene terephthalate, manufacture of the test samples and mechanical properties of the test samples When drying has been completed, the glass fiber strand packages (spinning cakes) are wound off and chopped into lengths of about 6 mm in a suitable cutting apparatus. The chopped strands are mixed with molten polybutylene terephthalate at 260° C. in a double-shaft extruder.

The mixture of glass fibers and polymer is extruded and granulated in a conventional manner. Test samples are produced from the granulate (glass content 29.4%) in a screw extruder and used to determine the following mechanical properties in accordance with the standards indicated:

| Impact strength | DIN 53 455 | 47.0 cm kp/cm$^2$ |
| Notched impact strength | DIN 53 453 | 10.8 cm kp/cm$^2$ |
| Flexural strength | DIN 53 452 | 1856 kp/cm$^2$ |
| Tensile strength | DIN 53 455 | 1520 kp/cm$^2$ |
| Tension-E-modulus | DIN 53 457 | 103 400 kp/cm$^2$ |

EXAMPLE 17

(a) Composition of the size used according to the invention

| Polyurethane cationomer dispersion (solids content 43%) | 11.6% by weight |
| γ-glycidoxypropyl trimethoxysilane | 0.25% by weight |
| Stearic acid amide | 0.05% by weight |
| Deionized water | 88.1% by weight |

(b) Preparation of the polyurethane cationomer dispersion 19 200 g (11.361 mole) of a polyester of equimolar adipic acid:

phthalic acid and ethylene glycol are dehydrated in a water jet pump vacuum at 120° C. for 2 hours with stirring. The polyester is cooled to 70° C. and 2880 g (17.143 mole) of 1,6-diisocyanatohexane are added. When the exothermic reaction has died down, the reaction mixture is stirred for a further 2 hours at 120° C. The mixture is left to cool to 70° C. and then diluted with 3 liters of acetone. The temperature is subsequently regulated so that the reaction is kept at 55° C. 465 g (3.908 mole) of N-methyldiethanolamine are dissolved in 1.5 liters of acetone and added to the reaction mixture which is subsequently diluted with a further 1.5 liters of acetone. A further 9 liters of acetone are added in the course of the next 3 hours to reduce the viscosity. 453 g (3.595 mole) of dimethyl sulfate in 1.5 liters of acetone are then added to the acetonic polyurethane solution which is then stirred for a further 30 minutes before a chin-lengthening solution consisting of 165 g (2.754 mole) of ethylene diamine, 7.5 g (0.073 mole) of diethylene triamine and 1600 g of distilled water is added.

An IR-spectrum taken 30 minutes later no longer shows an NCO-band.

450 ml of 20% phosphoric acid and 30 liters of distilled water previously heated to 50° C. are added to the reaction mixture. The acetone is then distilled off in a water jet pump vacuum. 300 cc of a 40% aqueous formaldehyde solution are added to the resulting finely divided dispersion which is then stirred for 1 hour at 50° C. and finally left to cool with stirring.

A finely divided, cationic polyurethane dispersion with a solids content of 43% and pH of 3 is obtained. It contains 0.23% by weight of quaternary nitrogen, based on the solids content, and its particle size is 75–100 μm.

The preparation and application of the size, processing of the glass fibers and their incorporation into polybutylene terephthalate and the production and testing of the test samples are carried out as described in Example 16.

(c) Mechanical properties of the test samples: glass content 28.3% by weight

| Impact strength | DIN 53 455 | 46.8 cm kg/cm² |
| --- | --- | --- |
| Notched impact strength | DIN 53 453 | 11.1 cm kp/cm² |
| Flexural strength | DIN 53 452 | 1856 kp/cm² |
| Tensile strength | DIN 53 455 | 1511 kp/cm² |
| Tension-E-modulus | DIN 53 457 | 104 200 kp/cm² |

EXAMPLE 16

Glass fibers are impregnated by the same method as described in Example 16 with a size which is not in accordance with the invention, consisting of the following conventional composition for glass fiber sizes:

| Polyvinyl acetate dispersion (solids content 5%) | 10% by weight |
| --- | --- |
| γ-methacryloxypropyl trimethoxysilane | 0.25% by weight |
| Stearic acid amide | 0.05% by weight |
| Deionized water | 89.7% by weight |

The glass fibers are then used in the same way as in Examples 16 and 17 for reinforcing the same polybutylene terephthalate as in these examples. Test samples made of the reinforced material (glass content 30.2% by weight) are found to have the following mechanical properties:

| Impact strength | DIN 53 455 | 41.4 cm kp/cm² |
| --- | --- | --- |
| Notched impact strength | DIN 53 453 | 8.9 cm kp/cm² |
| Flexural strength | DIN 53 452 | 1744 kp/cm² |
| Tensile strength | DIN 53 455 | 1087 kp/cm² |
| Tension-E-modulus | DIN 53 457 | 85 400 kp/cm² |

EXAMPLE 19

Glass fibers are impregnated by the same method as described in Example 16 with a size which is not in accordance with the invention, consisting of the following commercial composition:

| Styrene acrylonitrile copolymer dispersion (solids content 4%) | 12.5% by weight |
| --- | --- |
| γ-glycidoxypropyl trimethoxysilane | 0.25% by weight |
| Polyethylene dispersion (solids content 40%) | 1.25% by weight |

The fibers are then added in the same way as indicated in Example 16 for reinforcing the same polybutylene terephthalate. Test samples manufactured from the reinforced material (glass content 29.6% by weight) are found to have the following mechanical properties:

| Impact strength | DIN 53 455 | 30.3 cm kp/cm² |
| --- | --- | --- |
| Notched impact strength | DIN 53 453 | 6.6 cm kp/cm² |
| Flexural strength | DIN 53 452 | 1478 kp/cm² |
| Tensile strength | DIN 53 455 | 960 kp/cm² |
| Tension-E-modulus | DIN 53 457 | 91 500 kp/cm² |

A comparison of the mechanical properties shown in Examples 16 and 17 which are obtained when using the process according to the invention with the mechanical properties shown in Examples 18 and 19 which are obtained when using methods not in accordance with the invention for preparing sized glass fibers clearly shows the superiority of glass fibers produced according to the invention for the manufacture of glass fiber-reinforced polybutylene terephthalate.

Example 18 proves that, in order that sizes glass fibers will have maximum reinforcing effect in thermoplastic polyesters, it is not sufficient to use an epoxysilane as bonding agent and any film-forming agent in a size, as described in German OS No. 2 206 804. Rather it is of decisive importance to employ special combinations of bonding agents and film-forming agents in the size, as employed in accordance with the invention, particularly since a size for glass fibers generally contains ten to forty times as much film-forming agent as bonding agent. Example 19 proves that an unsuitable film-forming agent considerably impairs the advantageous effect of bonding agent and therefore distinctly reduces the reinforcing effect of the glass fibers.

It will be appreciated that the instant specification and examples are set forth by way of illustration and not limitation, and that various modifications and changes may be made without departing from the spirit and scope of the present invention.

What is claimed is:

1. An aqueous dispersion suitable for use as a sizing composition for glass fibers comprising a polyurethane anionomer as a film-forming agent, said polyurethane anionomer being characterized by
   (a) an average particle size of about 0.05μ to 0.5μ,
   (b) an ionic group content of about 5 to 30 milliequivalents per 100 g, and
   (c) forming a film when dried, this film having a tensile strength of at least about 50 kp/cm², an elongation at break of about 100–600%, a Shore-A-hardness of about 50–90, a swelling in water of less than about 30%, and being insoluble in 80% aqueous tetrahydrofuran after heating to 140° C.

2. An aqueous dispersion according to claim 1, wherein the polyurethane-anionomer is present in a concentration of about 1 to 15% by weight, the aqueous dispersion further containing an epoxy-containing bonding agent, said bonding agent being present in a concentration of about 0.05 to 1.5% by weight and being selected from the group consisting of (a) an epoxyalkyl alkoxysilane+an aminoalkyl-alkoxysilane, (b) an epoxyalkyl alkoxysilane+an aliphatic primary or secondary mono-amine, (c) an aminoalkyl alkoxysilane+a monoepoxide, and (d) an epoxyalkyl alkoxysilane.

3. An aqueous dispersion according to claim 1, wherein the polyurethane anionomer of the disperse phase is at least partly microgel in character, which microgel is fully reacted and contains no reactive groups.

4. An aqueous dispersion according to claim 1, wherein the polyurethane anionomer of the disperse phase contains reactive groups or reactive crosslinking agents.

5. An aqueous dispersion according to claim 4, containing about 0.1 to 10% of formaldehyde based on polyurethane solids as a crosslinking agent.

6. Glass fiber sized with a polyurethane anionomer according to claim 1.

7. E-glass fiber sized with a dispersion according to claim 2 and carrying about 0.4 to 2% by weight of polyurethane anionomer plus epoxy-containing bonding agent.

8. A thermoplastic resin selected from the group consisting of polyamides, polycarbonates and polyesters reinforced with E-glass fiber according to claim 6.

9. An aqueous dispersion suitable for use as a sizing composition for glass fibers comprising a polyurethane cationomer obtained from aliphatic and/or cycloaliphatic diisocyanates and phthalic ester groups containing polyhydroxy compounds as a film-forming agent, said polyurethane cationomer being characterized by
    (a) an average particle size of about $0.05\mu$ to $0.5\mu$,
    (b) an ionic group content of about 5 to 30 milliequivalents per 100 g, and
    (c) forming a film when dried, this film having a tensile strength of al least about 50 kp/cm$^2$, an elongation at break of about 100–600%, a Shore-A-hardness of about 50–90, a swelling in water of less than about 30%, and being insoluble in 80% aqueous tetrahydrofuran after heating to 140° C.

10. An aqueous dispersion according to claim 9, wherein the polyurethane-cationomer is present in a concentration of about 1 to 15% by weight, the aqueous dispersion further containing an epoxy-containing bonding agent, said bonding agent being present in a concentration of about 0.05 to 1.5% by weight and being selected from the group consisting of
    (a) an epoxyalkyl alkoxysilane + an aminoalkyl-alkoxysilane,
    (b) an epoxyalkyl alkoxysilane + a low-molecular weight aliphatic primary or secondary monoamine,
    (c) an aminoalkyl alkoxysilane + a low-molecular weight monoepoxide, and
    (d) an epoxyalkyl alkoxysilane.

11. An aqueous dispersion according to claim 9, wherein the polyurethane cationomer of the disperse phase is at least partly microgel in character, which microgel is fully reacted and contains no reactive groups.

12. An aqueous dispersion according to claim 9, wherein the polyurethane cationomer of the disperse phase contains reactive groups or reactive crosslinking agents.

13. An aqueous dispersion according to claim 12, containing about 0.1 to 10% of formaldehyde based on polyurethane solids as a crosslinking agent.

14. Glass fiber sized with a polyurethane cationomer according to claim 9.

15. E-glass fiber sized with a dispersion according to claim 10, and carrying about 0.4 to 2% by weight of polyurethane cationomer plus epoxy-containing bonding agent.

16. A thermoplastic resin selected from the group consisting of polyamides, polycarbonates and polyesters reinforced with E-glass fiber according to claim 14.

* * * * *